United States Patent [19]
Antritter et al.

[11] 3,861,218
[45] Jan. 21, 1975

[54] ARRANGEMENT FOR DAMPING OSCILLATIONS WITHIN A LIMITED FREQUENCY RANGE

[75] Inventors: Werner Antritter, Villingen; Norbert Helmschrott, Schwenningen, both of Germany

[73] Assignee: Keinzle Apparate GmbH, Villinger, Germany

[22] Filed: May 26, 1971

[21] Appl. No.: 147,126

[30] Foreign Application Priority Data
May 27, 1970  Germany.............................. 2025957

[52] U.S. Cl..................................... 73/430, 73/522
[51] Int. Cl......................... G01d 11/12, G01p 3/26
[58] Field of Search ............. 73/430, 496, 522, 579; 74/574; 188/1 B, 271; 64/26

[56] References Cited
UNITED STATES PATENTS

| | | |
|---|---|---|
| 440,151 | 11/1890 | Heinz................................... 73/430 |
| 1,015,476 | 1/1912 | Clouse ................................. 74/574 |
| 1,351,585 | 8/1920 | Poole.................................... 73/519 |
| 1,384,809 | 7/1921 | Smith.................................... 73/519 |
| 1,529,527 | 3/1925 | Wirrenga .............................. 74/574 |
| 3,118,027 | 1/1964 | Boyles............................... 64/56 X |
| 3,196,692 | 7/1965 | Jensen ............................ 73/519 X |
| 3,422,683 | 1/1969 | Powell ............................... 73/496 |

Primary Examiner—James J. Gill
Assistant Examiner—Daniel M. Yasich
Attorney, Agent, or Firm—Michael S. Striker

[57] ABSTRACT

Undesired oscillations caused by the flexible input shaft of a measuring instrument are dampened within a predetermined frequency range by low inertia damping means, including two damping elements connected by a liquid. One of the damping elements is frictionally mounted on a measuring shaft controlling indication and/or recording and slides on the same when the frequency of oscillation exceeds the predetermined range so that high frequency oscillations, associated with peak indications of the measuring instrument, are only partly dampened.

7 Claims, 5 Drawing Figures

ARRANGEMENT FOR DAMPING OSCILLATIONS WITHIN A LIMITED FREQUENCY RANGE

BACKGROUND OF THE INVENTION

The present invention relates to an arrangement for damping rotary oscillations in measuring instruments by means of a damping element, rotatable in a liquid and being turnable relative to a cylindrical second damping element which contains the liquid. The damping elements can be connected with the instrument casing and with rotary measuring means, respectively.

Generally, damping arrangements are used where the indicating pointer of an indicating measuring instrument, or the recording member of a registering measuring instrument is to quickly assume the correct indication of the measured value. This means that the kinetic energy caused by the measured value, must be partly consumed by the opposing torque of the damping means, while the magnitude of the opposing damping torque can be adapted to a specific measuring instrument by properly selecting the damping means. Inertia movement of the pointer or recording member, beyond the correct value, can be reduced, or completely suppressed in this manner.

On the other hand, it is known to provide damping means for measuring instruments which are constructed to have small masses and low inertia in order to represent the measured value without delay and correctly. Such damping arrangement of low inertia are very delicate and subject to disturbances. When the drive means of a measuring device of this type oscillates in the range of the self frequency of the measuring system, undesired rotary oscillations occur, which can be suppressed by damping means.

Conventional damping means, for example Eddy current damping means, require a comparatively great mass to perform at the required efficiency. Air damping devices, on the other hand, require large chambers, and high operational speeds so that the additionally required transmissions between the measuring device and the damping means of the measuring device, add undesired friction torques and masses of high inertia to the load. Consequently, and particularly for reasons of space, liquid damping means are preferred. Liquid damping means have a high efficiency even if very compact, so that it is possible to adjust the damping torque by selecting the viscosity of the damping liquid. It is known to use as damping liquid particularly a silicon oil, which has a substantially constant viscosity over a wide range of temperatures.

Damping means using oil are, on the other hand, only suitable where it is necessary to suppress undesired, and, compared with the variation of the measured value, high frequency indicating speeds, while the variations of the measured value take place comparatively slowly. However, there are operational conditions, for example when the revolutions of an engine of a motor car are measured, for example, when the transmission is shifted, a peak measured value occurs whose true magnitude is to be registered and indicated, and which should not be reduced and incorrectly indicated due to damping. An oil damping arrangement whose damping torque is, in the first approximation, proportional with the angular speed of the measuring to be dampened, would not be suitable for this purpose. Already at the measuring system, a small mass having low inertia must be used in order to follow the rapid variations of the revolutions upon shifting of the transmission of the engine. In such an arrangement, the undesired rotary oscillations influence the indication of the measured value. Such undesired rotary oscillations, which normally have a smaller amplitude than the measured peak indications occurring during shifting of the gears, are, for example, caused by a flexible shaft transmitting the measured value to the measuring means and to the indicating or recording means. In such an arrangement, the indication is not steady enough to be acceptable.

SUMMARY OF THE INVENTION

It is the object of the invention to provide a damping arrangement, which has the advantages of liquid damping means, and eliminates unsteady indications due to undesired rotary oscillations of small amplitude, but permits the indications of rapid variations of measured values having a great amplitude.

Another object of the invention is to dampen the indicating means or recording means of a measuring instrument over the entire frequency range of operations to eliminate a dynamic indication error by preventing a movement of the indicating and recording means beyond the correct measured value, so that the time required for a correct indication of the measured value is not unduly high.

Another object of the invention is to dampen the oscillation of measuring means controlling indication and recording, within a predetermined frequency range, but to reduce the damping effect when the predetermined frequency range is exceeded, and the high frequency indicates the presence of large amplitude peaks of the measured value.

With these objects in view, the present invention provides between means secured to the instrument casing and supporting a part of oil damping means on the one hand, and the measuring means on the other hand, a friction brake which limits the damping effect of the liquid damping means.

An arrangement according to the present invention comprises first and second damping elements, and a liquid between said damping elements; means for securing the first damping element either to stationary support means, or to rotary measuring means of a measuring instrument; and friction brake means connecting the second damping means either with the rotary measuring means or with a stationary support means, respectively, of the measuring instrument.

The arrangement is such that the friction brake slips above a predetermined frequency range of oscillation of the rotary measuring means whereby relative movement of the damping elements and the damping effect are limited. On the other hand, oscillation of the measuring means are fully dampened within the predetermined range.

In the preferred embodiment of the invention, the first damping element is a container containing silicon oil, the second damping element is a resilient member resiliently and frictionally engaging a shaft which is part of the friction brake means.

In one embodiment of the invention, this shaft is secured to the stationary supporting means of the instrument, while in another embodiment of the invention, the shaft is secured to the rotary measuring means which connects the measuring device with the indicating and recording means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
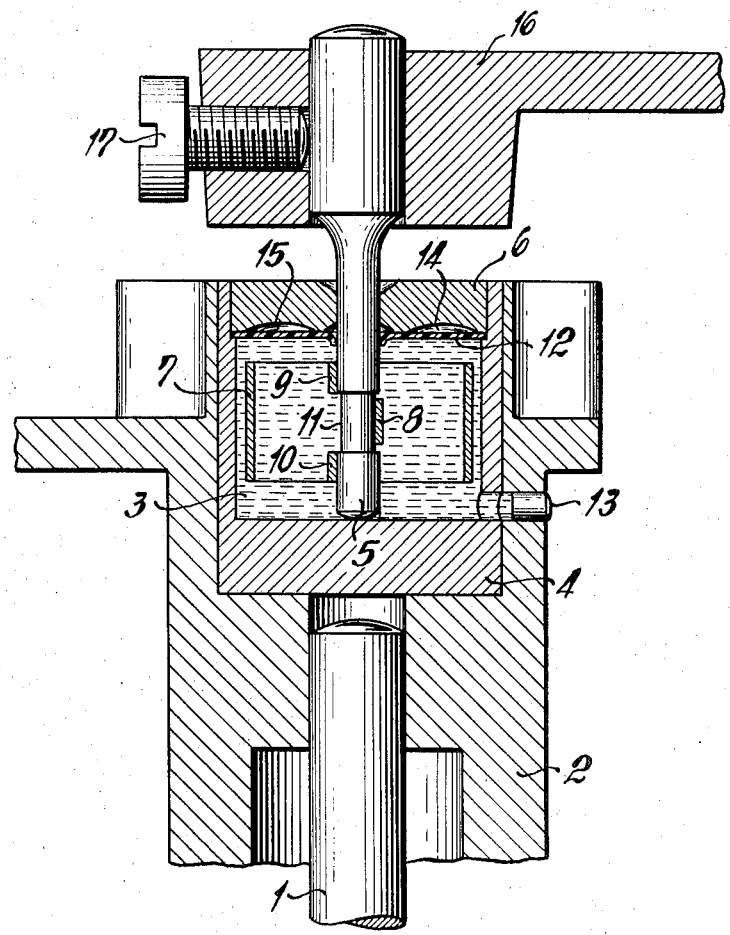
FIG. 1 is a fragmentary axial sectional view illustrating a first embodiment of the invention.

Referring first to FIG. 1, a measuring shaft 1, which may be part of an Eddy current measuring instrument, such as a speedometer, carries in addition to the Eddy current bell and return spring, now shown, a gear 2 by which the measured speed value, represented by the angular position of the measuring shaft 1, as described in the U.S. Pat. No. 3,422,683, for example, is transmitted to an indicating pointer and/or to a recording member drawing a line on a moving diagram sheet. Gear 2 has in one end face a cylindrical cavity in which a container 4 is seated with a press fit. Container 4 constitutes a first damping element and contains a liquid, such as oil, preferably silicon oil, in its interior 3. When a suitable material is selected for gear 2, container 4 may be omitted, and the cylindrical cavity in the gear 2 is filled with the damping oil, so that the hub of gear 2 constitutes a damping element. A second damping element 7 is located in the interior 3 of container 4, and is carried by a shaft 5 which is mounted in a central bearing formed by a closure plate 6 closing the open end of container 4.

Figure 2:
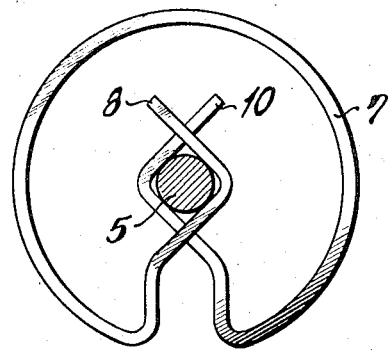
FIG. 2 is a fragmentary cross sectional view illustrating a damping element and friction brake used in the embodiment of FIG. 1.

As best seen in FIG. 2, the damping element 7 is a leaf spring bent into circular shape and having two end portions 8, 9, 10 which are angular and form recesses through which shaft 5 passes. The resilient pressure of the end portions 8, 9, 10, on shaft 5 produces friction between shaft 5 and end portions 8, 9, 10, so that a friction brake 5, 8, 9 10 is formed, permitting damping element 7 to turn relative to shaft 5 when a great torque acts on damping element 7.

The axial spacing between the two tongue end portion 9, 10 is slightly greater than the axial width of the other end portion 8. The single tongue 8 engages a recessed portion of shaft 5, between a pair of shoulders, so that the damping element 7 cannot be displaced in axial direction on shaft 5.

The oil chamber 3 is sealed by a foil 12, consisting of an elastomer, preferably a synthetic material, which is secured to the closure plate 6 in a suitable manner, and has a central opening for shaft 5. The diameter of the opening in foil 12 is smaller than the diameter of shaft 5, to assure a good seal. A bore 13, which opens into the interior 3 of container 4, is closed by a plug when chamber 3 is filled, but is used for venting chamber 3.

Recesses 14 and 15 in the inner surface of the closure end plate 6, permit the sealing foil 12 to yield into the recesses when the oil in container 3 is subject to thermal expansion.

When the measuring instrument is assembled, the portion of shaft 5 located outside of closure wall 6, is inserted into a bore in a fixed support means 16, and secured by a screw 17. Since support means 16 is an arm of a stationary instrument casing, shaft 5 is stationary, and does not turn. Accordingly, damping element 7 will normally not turn since the friction brake means 5, 8, 9, 10 frictionally hold damping element 7 against rotation on shaft 5. The rotary measuring means which includes shaft 1 and gear 2, rotates with shaft 1 to an angular position representing a measured speed, as described in U.S. Pat. No. 3,422,683, and during such rotation, container 4, 6, which also constitutes a damping element, rotates relative to the damping element 7, exerting a torque through the liquid in chamber 3, within a normal frequency range of oscillations of the rotary measuring means 1, 2. When the damping torque transmittd to damping element 7 is insufficient for turning the same on shaft 5, measuring means 1, 2 is dampened. Evidently, when the damping torque becomes very high, damping element 7 will turn with damping element 4, while the friction surfaces of tongues 9, 10, 8 slide on the corresponding surfaces of shaft 5.

In the embodiment of FIG. 1, the first damping element 4 is secured to the angularly displaceable measuring means 1, 2, and the second damping element 7 is frictionally connected by the friction brake means 5, 8, 9, 10 with the stationary supporting means 16.

Figure 4:
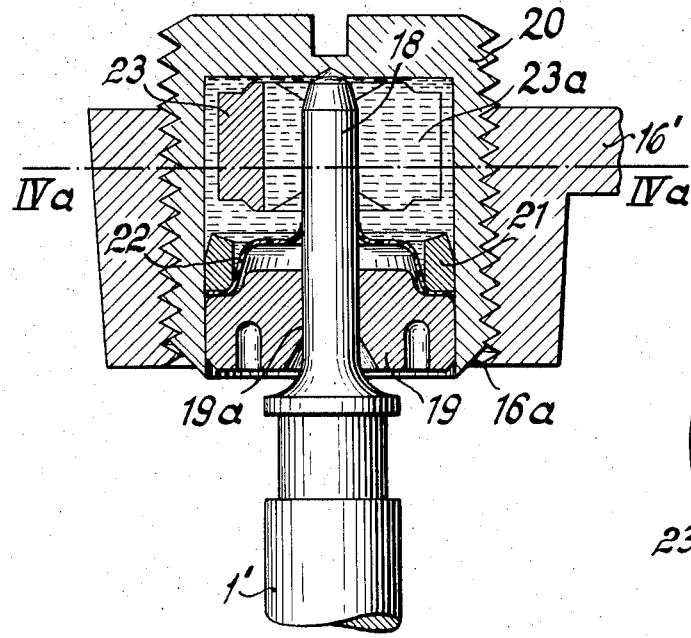
FIG. 4 is a fragmentary axial sectional view illustrating a second embodiment of the invention.
Figure 4A:
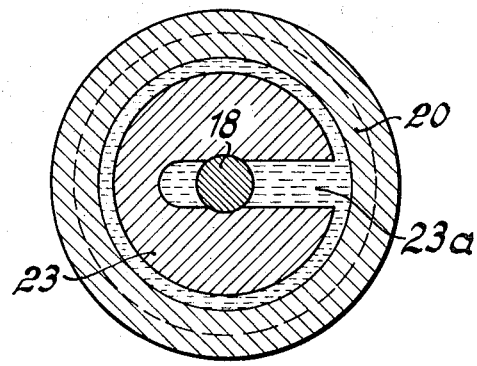
FIG. 4a is a cross sectional view taken on line IVa—IVa in FIG. 4.

In the embodiment of FIG. 4, the container, which constitutes the first damping means is secured to stationary support means 161, while the shaft 18 of the friction brake is the end position of the angularly displaceable measuring shaft means 1' whose angular position represents the measured value, and which is subject to oscillations. A gear, not shown, corresponding to gear 2, connects the measuring shaft 1' with indicating and/or recording means, not shown. A first damping element in the form of a container 20 has a thread on its outer periphery, and is fixedly threaded into a corresponding threaded bore 16a in the stationary, support 16'. A closure plate 19 closes container 20, and has a bearing 19a for the rotary shaft end portion 18. Between closure plate 19, and a fixed abutment ring 21, a sealing foil 22 is clamped for sealing the upper portion of container 20 which is filled with oil.

A cylindrical resilient body 23, having a radial slot 23a, constitutes the second damping element, and is turnably mounted on shaft 18. However, due to pretensioning of the resilient body 23, the inner surface of slot 23a abuts the outer surface of shaft 18 so that the engaging surfaces frictionally resist turning of the damping body 23 in a manner of a friction brake. If is an advantage of the embodiment of FIG. 4 that the damping container 20 can be easily exchanged, and if desired, replaced by a bearing for mounting shaft 18 in support means 16.

Due to the frictional engagement between the shaft 18 and the slotted damping body 23, oscillation at normal frequency within a predetermined frequency range will be transmitted to damping body 23, and damped by the liquid in container 20. However, at high frequencies above a predetermined range, resistance offered by the liquid in container to the angular movement of damping body 23 is so great that damping body 23 slips on shaft 18 and the damping effect is limited.

The functioning of the damping arrangement of the invenion will now be explained with particular reference to the embodiment of FIG. 1. The rotary speed or number of revolutions is supplied to the measuring instrument by a flexible shaft, and to the magnet of an Eddy current device, not shown, whose bell and spring are secured to the measuring shaft 1 which assumes together with gear 2 an angular position representing the speed which is recorded under the control of gear 2 and, if desired, indicated.

Superimposed on the revolutions of the flexible input shaft, are rotary oscillations, which result in an unsteady indication or recording, if the measuring device is constructed to have small movable masses with low inertia. Such a construction is absolutely necessary for measuring the rotary speed of the engine of a motor car, since very rapid changes in the number of revolutions, as occur during shifting of the transmission, must be measured and represented without any delay by the measuring instrument.

Figure 3:
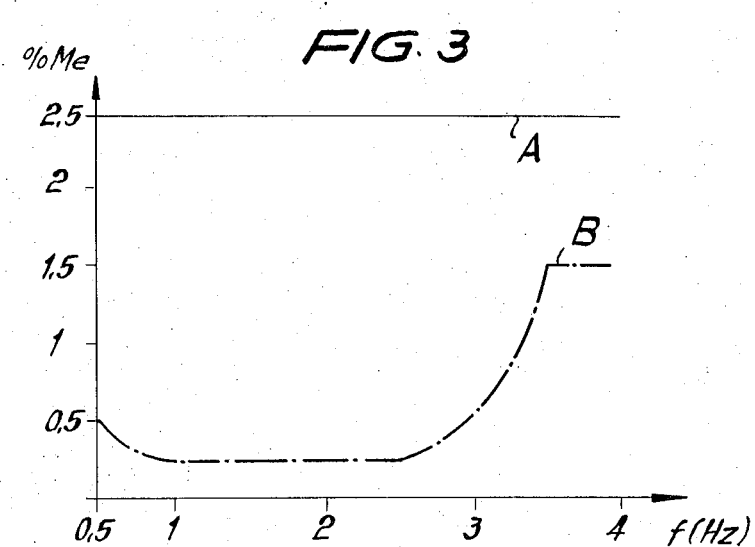
FIG. 3 is a diagram illustrating variations of the damping effect in accordance with the invention.

As shown in FIG. 3, it is assumed that the superimposed rotary oscillations are 2.5 percent of the highest measured value. The line at A represents the envelope curve of the deflections of the undampened measuring system over the frequency between 0.5 and 4Hz.

The damping arrangement according to the present invention has the effect that up to a frequency of 2.5Hz, the undesired oscillations are reduced to at least 0.5 percent of the end value of the measuring range, as represented by graph B. This frequency range is sufficient, since the usual rotary oscillations take place at a frequency below 3Hz. Above the limit frequency of 2.5Hz, the respective damping element 7 turns relative to the stationary shaft 5, which means that the oil damping loses its efficiency so that, as shown by graph B, starting at 3.5Hz, the indication will oscillate for 1.5 percent of the end value of the measuring range, if in this range a input oscillation, superimposed on the measured value, is present as indicated by the line A.

This means that the undesired oscillations of the indicating means can be reduced by the oil damping means, while on the other hand, very rapid true variations of the rotary speed are not suppressed, but are transmitted to the indication means through the friction brake between element 7 and shaft 5 in FIG. 1. This characteristic of the damping arrangement of the invention is obtained due to the fact that the damping torque of the oil damping is limited by the additional friction brake to a friction torque of, for example, $M_F = 2$ pcm, while below this torque, the damping torque rises proportional with the angular rotary speed.

Due to the damping effect of the oil damping means over the entire range of measurements, the time required before an indicating means assumes its final position indicating a measured value, is increased. This is particularly the case for variations of the measured value whose adjusting torque is below the friction torque of the damping element 7. On the other hand, a movement of the measuring system beyond the correct value due to inertia, which is to some degree favored by the effect of the separation of the friction brake, and which is unavoidable due to the requirement for a correct indication of great variations of the measured value, is reduced to less than one-half of corresponding effects in an undampened system. This is due to the fact that the inertia movement beyond the correct position is a free oscillation whose energy is quickly dissipated.

Summarizing, it may be mentioned that due to the combination of oil damping with a friction brake, the result is obtained that rapid small oscillations are supressed, while large and faster variations of the measured value are registered and indicated, so that the indication is steady, while the correct value of great variations of the measured value is indicated, and inertia movements beyond the correct position of the indicating means is prevented by the friction torque.

It will be understood that each of the elements described above, or two or more together, may also find a useful application in other types of arrangements for damping oscillations of the measuring means of a measuring instrument differing from the types described above.

While the invention has been illustrated and described as embodied in an arrangement for damping oscillations within a limited frequency range, including a friction brake which ends the damping effect at high frequency oscillations associated with peak indications, it is not intended to be limited to the details shown, since various modifications and structural changes may be made without departing in any way from the spirit of the present invention.

Without further analysis, the foregoing will so fully reveal the gist of the present invention that others can be applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. An oscillation damping arrangement comprising stationary support means; measuring means angularly displaceable relative to said stationary support means and representing in the displaced position a measured value; a first damping element in the form of a container fixedly secured to one of said means, and the other of said means having a fixedly secured portion extending into said container; liquid filling said container; a second damping element located within the liquid in said container; and friction brake means frictionally connecting said second damping element to said fixedly secured portion of said other means in said container, so that said friction brake means slips only above a predetermined frequency range of oscillation of said measuring means whereby relative damping movement of said first and second damping elements and damping of said measuring means does not take place above said predetermined frequency range, while the oscillations of said measuring means are fully dampened within said predetermined frequency range.

2. Oscillation damping arrangement as claimed in claim 1 wherein said first damping element fixedly is secured to said angularly displaceable measuring means, and said second damping element is frictionally connected by said friction brake means with said support means.

3. Oscillation damping arrangement as claimed in claim 1 wherein said first damping element is fixedly secured to said support means, and said second damping element is frictionally connected by said friction brake means with angularly displaceable means.

4. Oscillation damping arrangement as claimed in claim 1 wherein said second damping element is a circular spring having radially inward bent angular end portions resiliently abutting said portion and frictionally engaging the same; wherein said container for said liquid has a cylindrical wall; and wherein said spring is located in said liquid in said container radially spaced a small distance from said cylindrical wall.

5. Oscillation damping arrangement as claimed in claim 1 wherein said angularly displaceable measuring means includes a measuring shaft and a gear fixedly secured to said measuring shaft and having a cylindrical cavity; wherein said container is secured in said cavity; and wherein said second damping element is located in said liquid in said container and is frictionally connected by said friction brake means with said support means.

6. Oscillation damping arrangement as claimed in claim 1 wherein said first damping element is a cylindrical container for said liquid and has an outer thread; wherein said support means has a bore with an inner thread; wherein said container is threaded into said bore and secured to said support means; and wherein said second damping element is connected by said friction brake means with said measuring means.

7. An oscillation damping arrangement comprising stationary support means; measuring means angularly displaceable relative to said stationary support means and representing in the displaced position a measured value; a first damping element in the form of a container fixedly secured to one of said means and the other of said means including a shaft fixedly secured to said other means and extending into said container; liquid filling said container; a second damping element located within said liquid in said container, said second damping element being a resilient cylindrical body having a radial slot, said slot having an inner surface resiliently abutting said shaft and constituting a friction brake means rotatably supporting said body on said shaft and frictionally coupling said body with said shaft, said friction brake means frictionally connecting said second damping element with said other means so that said second damping element is frictionally coupled with said shaft within a predetermined frequency of oscillations of said measuring means, but slips on said shaft above said frequency range, whereby relative damping movement of said damping elements and damping of said measuring means does not take place within said predetermined range, while the oscillations of said measuring means are fully dampened within said predetermined frequency range.

* * * * *

UNITED STATES PATENT OFFICE
CERTIFICATE OF CORRECTION

PATENT NO. : 3,861,218
DATED : January 21, 1975
INVENTOR(S) : Werner Antritter and Norbert Helmschrott It is certified that error appears in the above-identified patent and that said Letters Patent are hereby corrected as shown below:

In the Heading, insert:

[73] Assignee: Kienzle Apparate GmbH,
Villingen, Germany

Signed and sealed this 24th day of June 1975.

(SEAL)
Attest:

RUTH C. MASON
Attesting Officer

C. MARSHALL DANN
Commissioner of Patents
and Trademarks